Patented Sept. 7, 1943

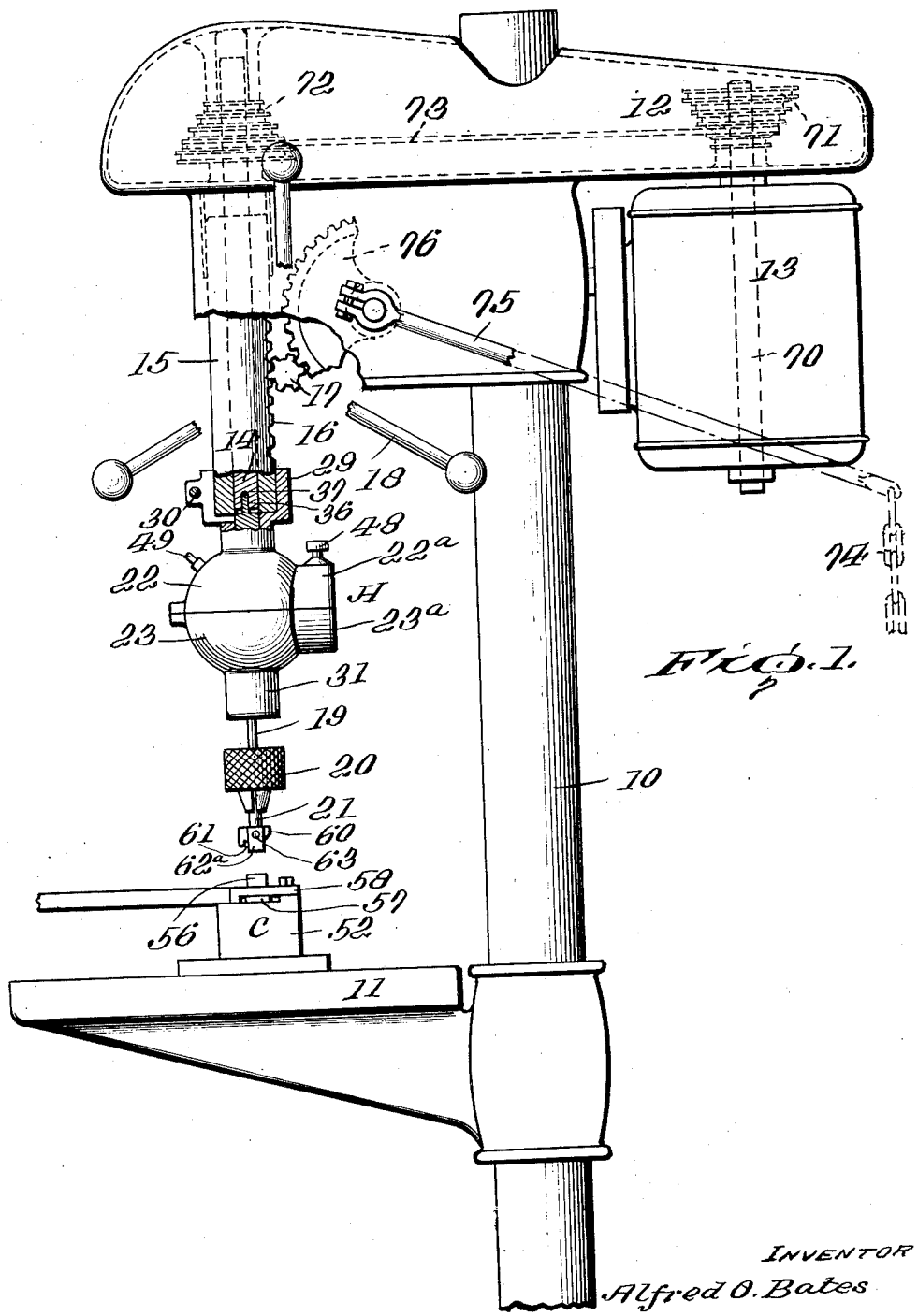

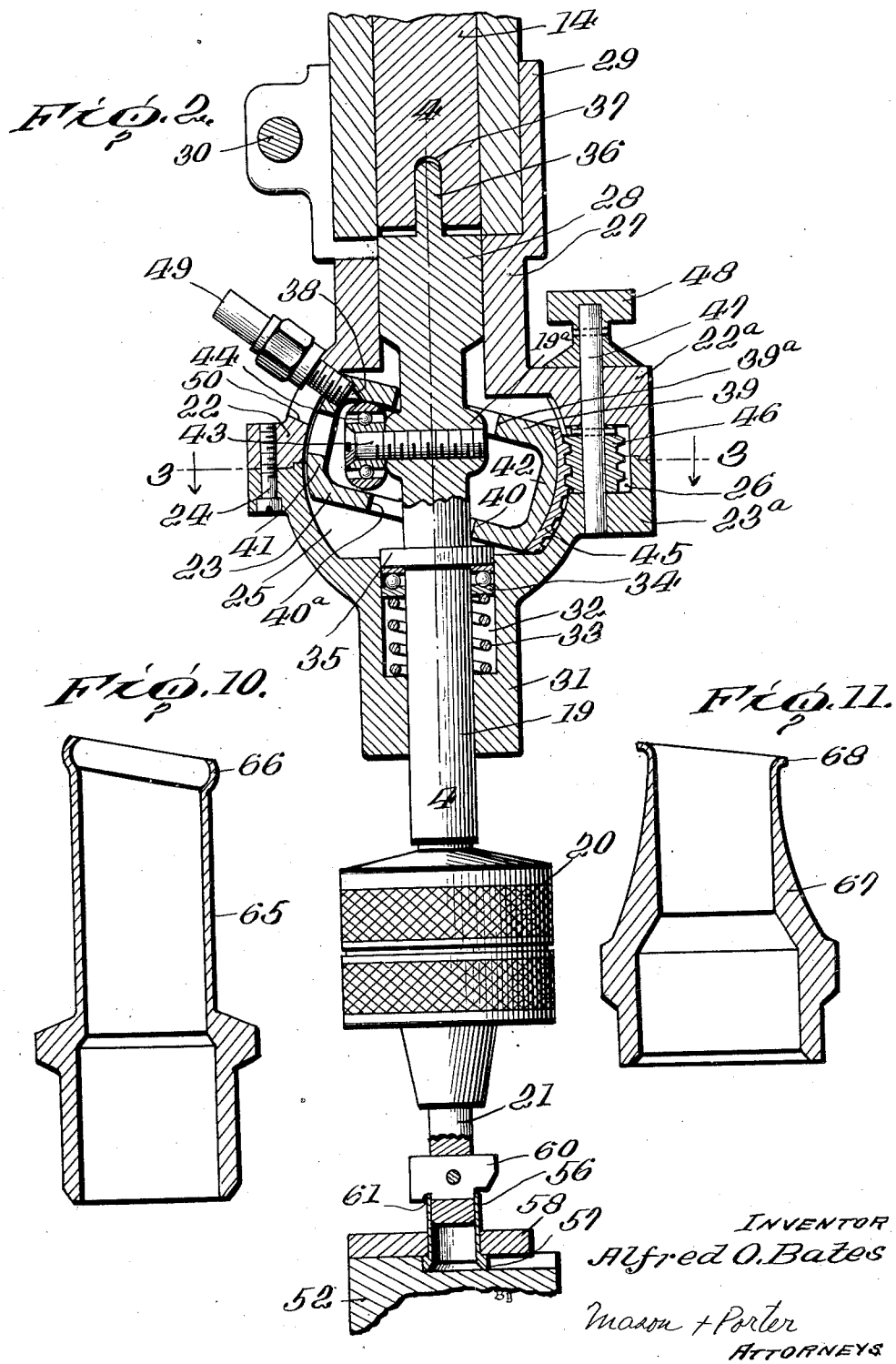
Sept. 7, 1943. A. O. BATES 2,328,542
METALWORKING MACHINE
Filed Sept. 29, 1939 3 Sheets-Sheet 2
INVENTOR
Alfred O. Bates
Mason + Porter
ATTORNEYS

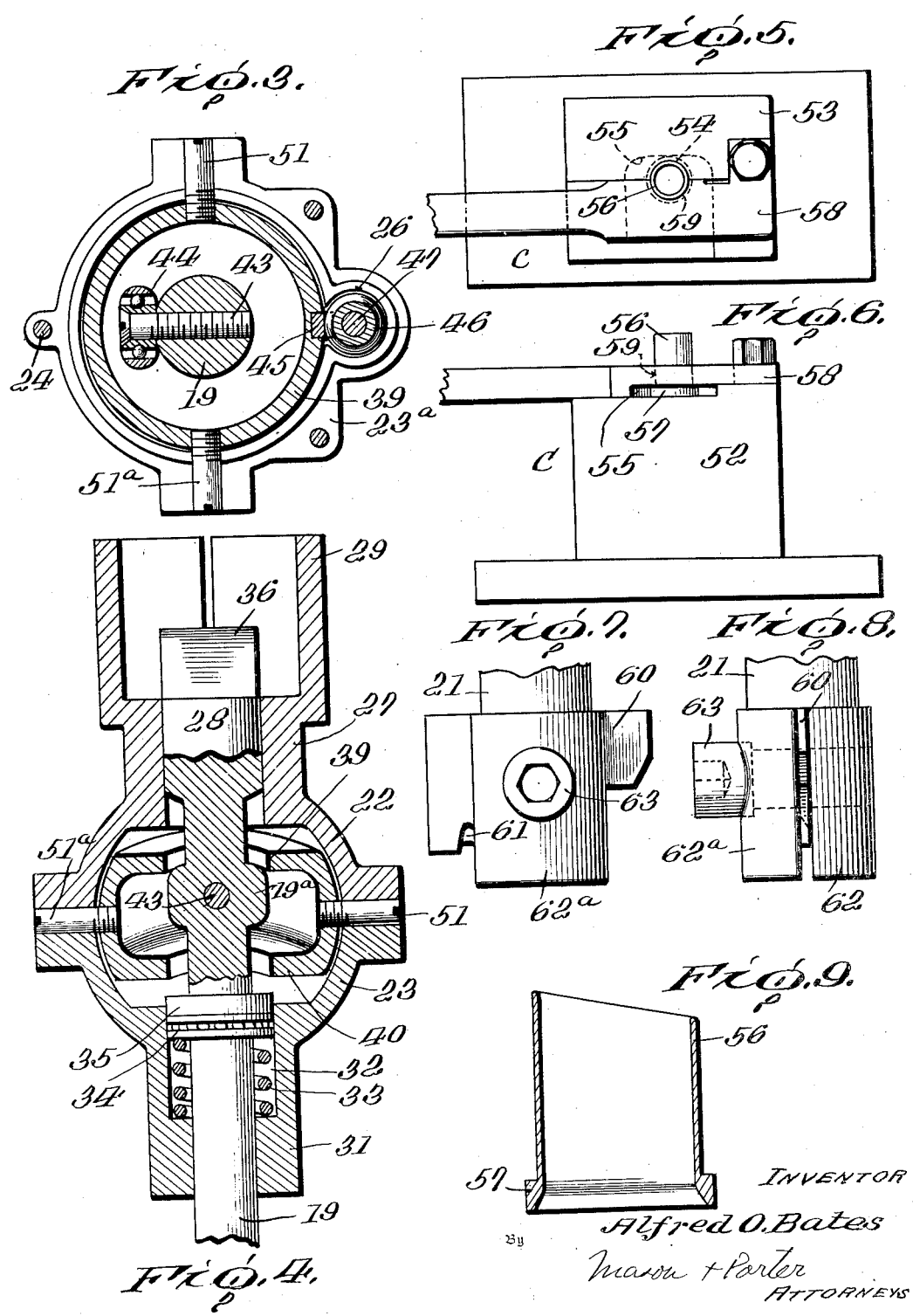

2,328,542

UNITED STATES PATENT OFFICE 2,328,542

METALWORKING MACHINE

Alfred O. Bates, Cleveland Heights, Ohio, assignor to Arthur L. Parker, Cleveland, Ohio Application September 29, 1939, Serial No. 297,177

15 Claims. (Cl. 82—19)

The present invention relates to new and useful improvements in machine tool units, and more particularly to improvements in a metal working machine for shaping the ends of tubular articles or the like.

In general, the invention contemplates the provision of a machine for shaping the ends of tubular articles, and while the invention is specifically illustrated in connection with the cutting of the ends of metal tubes, still it is to be clearly understood that the invention has a wide variety of other applications. It is often desirable to provide tubular articles which have the peripheral edges, or at least, one edge thereof, shaped at an angle with respect to the central axis. For instance, tube couplings of the type shown in the patent to Arthur L. Parker No. 1,893,442, dated January 3, 1933, include a metal clamping sleeve as an element thereof. It has been found advantageous to cut the free end of this clamping sleeve along a plane which is disposed at an angle with respect to the central axis of the sleeve so as to distribute stresses which are set up in the coupling due to vibration.

An object of the present invention is to provide a machine for shaping the end of a tubular article so that portions of the peripheral edge thereof are spaced from one another with respect to the longitudinal axis of the article.

A further object of the invention is to provide a machine of the above type wherein the shaping tool is reciprocated during the feeding movement thereof so as to effect the desired angular shaping of the article.

A still further object of the invention is to provide a machine of the above type wherein a cutting tool is employed for cutting the end of a metal tube along a plane which is disposed at an angle with respect to the central axis of the tube, and wherein the cutting tool is caused to travel downwardly and upwardly during each revolution thereof.

A still further object of the invention is to provide a machine of the above type wherein the driving spindle and the tool spindle are rotated in unison, and wherein the tool spindle is reciprocated longitudinally of the axes of both spindles during the rotation thereof.

A still further object of the invention is to provide a machine of the above type wherein cam means is provided for effecting the desired longitudinal reciprocation of the shaping tool.

The above and other objects will in part be obvious and will be hereinafter more fully pointed out.

In the drawings—

Figure 1 is a side elevation of the complete machine with a portion thereof in section to show the connection between the driving spindle and the tool spindle;

Fig. 2 is an enlarged longitudinal section through the housing for the tool spindle and a portion of the driving spindle showing the mechanism for effecting the reciprocation of the tool spindle;

Fig. 3 is a sectional view taken along the line 3—3 of Fig. 2;

Fig. 4 is a sectional view taken along the line 4—4 of Fig. 2;

Fig. 5 is an enlarged plan view of the work clamping device;

Fig. 6 is a side elevation of Fig. 5;

Fig. 7 is a fragmentary side elevation of the cutting tool and clamping means therefor;

Fig. 8 is a view taken at right angles to Fig. 7, and

Fig. 9 is a detail sectional view showing the finished metal tube.

Fig. 10 is a detail sectional view showing a metal tube with the inclined end thereof outwardly beaded.

Fig. 11 is a detail sectional view of another form of metal tube having the inclined end thereof outwardly flared.

Referring more in detail to the accompanying drawings, and particularly to Figure 1 thereof, the assembled machine is illustrated as including a supporting standard 10 on which a laterally extended work supporting table 11 is suitably mounted. Suitably mounted near the top of the standard 10 is a housing 12 within which is disposed conventional mechanism (Figure 1) by which a motor 13 imparts rotation to a driving spindle 14. The driving spindle 14 rotates within a sleeve or housing 15 and is reciprocable in unison therewith. For this purpose, the sleeve 15 has a rack portion 16 with which a pinion 17 is in mesh. Suitable handle devices 18 are employed for rotating the spindle 17 in either direction in order to move the sleeve 15 and the driving spindle 14 downwardly and upwardly. A suitable work clamping device C is carried by the table 11 and the details thereof will be hereinafter more fully pointed out. A housing or casing H is fixed to and supported by the sleeve 15 and this housing encloses the mechanism for reciprocating the tool spindle 19, longitudinally of the center axis of the driving spindle 14 which is in axial alignment with the tool spindle. The lower end of the tool spindle 19 carries a suitable chuck 20 for holding a tool bit 21.

The details of the housing H, the reciprocating mechanism enclosed therein and the tool spindle 19 will now be particularly described, reference being had to Figures 3, 4 and 5 of the accompanying drawings. The housing H includes a pair of oppositely disposed upper and lower casing members 22, 23 which are substantially semispherical in shape. These casing members 22, 23 are secured together by bolts 24 or the like. The semispherical casing members are shaped to provide a substantially spherical internal chamber 25 and a small chamber 26 communicating therewith and disposed between the enlarged flange portions 22a, 23a on the casing members 22, 23, respectively. The upper housing part 22 is provided with a lower sleeve portion 27 providing a bore for the upper end 28 of the tool spindle 19 and the sleeve portion 27 is extended to provide a split clamping ring 29 encircling the lower end of the spindle sleeve 15. The ends of the ring 29 are securely clamped together by a bolt 30 or the like. The lower housing part 23 is provided with a depending portion 31 which is internally bored to receive the lower end of the tool spindle 19 which extends therethrough. The depending portion 31 is counterbored to provide an internal recess 32 around the tool spindle or shaft 19. A coil spring 33 is disposed within the recess 32 and bears against a suitable ball bearing assembly 34 which is disposed immediately beneath an annular flange 35 on the tool spindle 19. Thus, the coil spring 33 tends to normally force the tool spindle 19 upwardly.

The upper end 28 of the tool spindle 19 is provided with a transverse rib 36 which fits within a corresponding slot 37 in the lower end of the driving spindle 14. This form of connection provides for the rotation of the tool spindle 19 in unison with the driving spindle 14 but permits relative longitudinal movement of the tool spindle 19 with respect to the driving spindle 14. A hollow member 38 is disposed within the chamber 25 in the casing H. This member 38 constitutes a cam member and includes upper and lower wall portions 39, 40, respectively and substantially spherical side wall portions 41, 42. The member 38 may thus be considered a segment member and the upper and lower flat wall portions 39, 40 are provided with central apertures 39a, 40a. The tool shaft 19 extends through the apertures 39a, 40a and these apertures are large enough to permit angular movement of the segment member 38 within the chamber 25 without interfering with the operation of the tool shaft 19. The shaft 19 is provided with an enlarged portion 19a disposed substantially within the member 38 and a bolt 43 is secured to this enlarged portion. The free end of the bolt carries a ball bearing assembly 44, the outer race bearing against the inner surface of the upper wall portion 39 of the member 38 and constituting a cam engaging member. The spring 33 serves to normally maintain the outer race of the ball bearing assembly in contact with the inner camming surface of the upper wall portion 39 and slightly spaced from the inner surface of the lower wall portion 40 when the member 38 is in the position shown in Fig. 2. The side wall 42 of the member 38 is provided with a rack portion 45 which is in mesh with a worm 46 disposed within the recess 26. The worm 46 is carried by a shaft 47 which may be turned by an operating knob 48. The side wall portion 41 of the member 38 has threadedly secured thereto a grease cup or similar oiling device 49 which extends through a slot 50 in the casing member 22. The oiling device 49 is provided with a base portion 49a which overlies the slot 50 and is adapted to engage the outer surface of the housing in the region of the slot so that tightening of the oiling device by means of its threaded engagement with the wall portion 41 will serve as a friction holding means for maintaining the member 38 in any one of its various adjusted positions. The member 38 is pivotally mounted within the chamber 25 by pins 51, 51a which are secured between the casing members 22, 23 so that the member 38 is prevented from rotating about the axis of the shaft 19. However, the worm 46 and rack 45 serve as a means for adjusting the angular disposition of the member 38 with respect to the shaft 19.

When the member 38 is in the position shown in Fig. 2 with the lower wall portion 40 abutting against the surface of the casing member 23, the maximum angular cut on the work can be effected. In this position of the device, rotation of the driving spindle 14 and the corresponding rotation of the tool spindle 19 will carry the ball bearing assembly 44 around with the spindle 19. The outer race of the ball bearing assembly will follow the inner surface of the upper wall portion 39 of the member 38 and so effect reciprocation of the tool spindle 19. A sufficient space is provided between the upper and lower wall portions of the member 38 to permit the tool shaft to reciprocate therein without interference. Similarly, the dimensions of the slot 37 and the rib 36 on the tool spindle 19 are such that the spindle 19 can be reciprocated longitudinally of its axis without becoming disconnected from the driving spindle 14. It will be seen, therefore, that rotation of the tool spindle 19 will cause the outer race of the ball bearing assembly 44 to follow the inclined inner surface of the upper wall portion 39 of the member 38 and thus cause the spindle 19 to travel downwardly and upwardly during each complete revolution thereof. The longitudinal movement of the spindle 19 relative to the driving spindle 14 can be adjusted by shifting the angular position of the member 38 relative to the tool spindle. For instance, the worm 46 may be turned so that the member 38 will be disposed in a horizontal position with respect to the shaft spindle 19 so that no reciprocation of the spindle will be effected.

The work clamping device C (Figs. 5 and 6) is suitably mounted on the table 11 and is illustrated as including a block 52 which includes a raised portion 53 at one side thereof. This raised portion has a semicircular recess 54 which is undercut, as at 55. The sleeve 56, shown in Fig. 9, is placed within the recess 54 and the shoulder 57 on the sleeve is disposed beneath the recessed portion in the undercut portion on the raised part 53. The sleeve 56 may be clamped in this position by means of a pivoted arm 58 which is also provided with a semicircular recess 59 oppositely disposed with respect to the recess 54. This portion of the pivoted arm 58 is spaced above the block 52 so that the shoulder 57 on the sleeve is disposed thereunder. Thus, the sleeve 56 may be conveniently held in position for a cutting or similar operation.

The chuck 20 and bit 21 may be of any conventional type.

The operating tool is illustrated in Figs. 7 and 8, as being a cutting tool 60 having a cutting edge 61. This cutting blade extends through the lower end of the bit 21 and is clamped thereto by a pair of semicircular clamping plates 62, 62a which, in turn, are held together by a clamping screw 63. The lower ends of the clamping plates 62, 62a serve as a centering device to exactly fit within the cylindrical portion of the sleeve 56, thus properly guiding the cutting edge 61 with respect to the work.

When it is desired to form a sleeve of the type shown in Figure 9, this sleeve is clamped by the arm 58 and the raised part 53 on the clamping device C. The driving spindle 14 is rotated by means of its connection with the motor 13. Thus, the motor shaft 70 carries an inverted nest of pulleys 71 and the driving spindle 14 is suitably associated with an upright nest of pulleys 72. A belt 73 connects any two pulleys of the nests 71, 72 for effecting desired rotation of the driving spindle. This rotation of the driving spindle 14 will effect corresponding rotation of the tool spindle 19 by reason of the rib and slot connection therebetween. In positioning the cutting tool relative to the work, the handles 18 may be manipulated to lower the driving spindle 14 and the spindle sleeve 15 together with the housing H and the cutting tool. Instead of the handles 18, the assembly may also be lowered by means of a foot treadle (not shown) which may be connected by a chain 74 to an arm 75 which, in turn, is secured to a rake 76 engaging the spindle 17.

Upon rotation of the tool spindle 19, assuming that the member 38 has been previously set to the desired angular position, the outer race of the ball bearing 44 will be caused to travel over the inner surface of the wall 39 of the member 38. From the position shown in Figure 2, this will effect a downward and then an upward movement of the tool spindle 19 during one complete revolution thereof. Thus, the cutting surface of the cutting tool will be caused to travel in a plane which is inclined with respect to the longitudinal axis of the sleeve which is to be worked. The inclination of this plane will be determined by the angular setting of the member 38. During the working of each sleeve, the cutting tool and the driving assembly are gently urged downwardly by means of the handles 18 or the foot treadle. Therefore, this movement of the cutting tool 60 will effect progressive cutting of the tubular sleeve 56 until the angularly cut surface extends entirely across the same, as shown in Figure 9. It is believed that the operation of the apparatus is obvious from the foregoing description.

The apparatus of this invention can also be employed for shaping sleeves of the type shown in Figures 10 and 11. The end of the sleeve 65, shown in Figure 10, has been previously cut to the desired angle with respect to the longitudinal axis thereof and a suitable tool can be substituted for the cutting tool and operated by the apparatus to provide the outward bead 66 around the end of the sleeve 65. Of course, the base of the sleeve 65 is not identical with the lower part of the sleeve 56, but a suitable form of work clamping device can be substituted for securely holding this type of sleeve in place. In Figure 11, a further form of sleeve 67 has had the end thereof previously cut to the desired angle. By again changing the metal working tool, the angularly cut end of the sleeve 67 can be flared outwardly, as at 68.

While one form of driving mechanism has been shown in the drawings, it is to be clearly understood that it may also be used with a lathe or other suitable source of power. For instance, it might be directly connected to a motor shaft for operation. While a single cutting tool has been shown, it will also be clear that two or more cutting tools may be employed for effecting different formations on a sleeve, as for instance, a scalloping or pyramid formation.

It is believed that the operation and novel features of the invention will appear obvious from the foregoing description and it is to be clearly understood that various changes in the details of construction and arrangement of parts may be made without departing from the scope of the invention as set forth in the appended claims.

I claim:

1. A metal working machine, comprising a rotatable driving spindle, a tool spindle connected to said driving spindle for rotation in unison therewith and for longitudinal reciprocation relative thereto, a housing through which said tool spindle extends, said housing being fixed against rotation, a member pivotally mounted within said housing and surrounding said tool spindle, means for adjusting the angular position of said member, and means rotatable with said tool spindle and cooperating with said member for effecting the desired longitudinal reciprocation of said tool spindle depending upon the angular adjustment of said member.

2. A metal working machine, comprising a rotatable driving spindle, a housing fixed against rotation, a tool spindle extending through said housing and connected to said driving spindle for rotation in unison therewith and for longitudinal reciprocation relative thereto, a hollow member pivotally mounted within said housing and surrounding said tool spindle and fixed against rotation about the axis of said tool spindle, said hollow member providing an internal camming surface, a rack fixed to one side of said hollow member, means cooperating with said rack for effecting the angular adjustment of said hollow member, and means rotatable with said tool spindle and disposed within said hollow member and cooperating therewith for effecting the desired longitudinal reciprocation of said tool spindle depending upon the angular adjustment of said hollow member.

3. A metal working machine, comprising a rotatable driving spindle, a housing fixed against rotation, a tool spindle extending through said housing and connected to said driving spindle for rotation in unison therewith and for longitudinal reciprocation relative thereto, a hollow member pivotally mounted within said housing and surrounding said tool spindle and fixed against rotation about the axis of said tool spindle, said hollow member providing an internal camming surface, a rack fixed to one side of said hollow member, means cooperating with said rack for effecting the angular adjustment of said hollow member, and means providing a bearing assembly rotatable with said tool spindle and cooperating with the camming surface on said hollow member for effecting the desired longitudinal reciprocation of said tool spindle depending upon the angular adjustment of said hollow member.

4. A metal working machine, comprising a rotatable driving spindle, a housing fixed against rotation, a tool spindle extending through said housing and connected to said driving spindle for rotation in unison therewith and for longitudinal reciprocation relative thereto, a hollow member pivotally mounted within said housing and surrounding said tool spindle and fixed against rotation about the axis of said tool spindle, said hollow member providing an internal camming surface, a rack fixed to one side of said hollow member, means cooperating with said rack for effecting the angular adjustment of said hollow member, means providing a bearing assembly rotatable with said tool spindle and cooperating with the camming surface on said hollow member for effecting the desired longitudinal reciprocation of said tool spindle depending upon the angular adjustment of said hollow member, and spring means disposed within said housing and cooperating with said tool spindle for forcing the said tool spindle upwardly whereby to maintain said bearing assembly in engagement with said camming surface.

5. A metal working machine, comprising a rotatable driving spindle, a housing fixed against rotation, a tool spindle extending through said housing and connected to said driving spindle for rotation in unison therewith and for longitudinal reciprocation relative thereto, a hollow member pivotally mounted within said housing and apertured to surround said tool spindle and fixed against rotation about the axis of said tool spindle, said hollow member providing an internal camming surface, a rack fixed to one side of said hollow member, a worm gear carried by said housing and cooperating with said rack for effecting the angular adjustment of said hollow member, and means rotatable with said tool spindle and disposed within said hollow member and cooperating with the camming surface thereon for effecting the desired longitudinal reciprocation of said tool spindle depending upon the angular adjustment of said hollow member.

6. A metal working machine, comprising a rotatable driving spindle having a recess in the lower end thereof, a non-rotatable sleeve surrounding said driving spindle, a housing fixed on the end of said sleeve, a tool spindle extending through said housing and having a rib fitting within the recess in said driving spindle for effecting rotation thereof in unison with said driving spindle but permitting longitudinal reciprocation relative thereto, means providing a camming surface within said housing and surrounding said tool spindle, said camming surface being fixed against rotation with the tool spindle, means for adjusting the angular disposition of the camming surface relative to the axis of said tool spindle, and means rotatable with said tool spindle and cooperating with the camming surface for effecting the desired longitudinal reciprocation of said tool spindle depending upon the angular adjustment of said camming surface.

7. A metal working machine, comprising a rotatable driving spindle, a non-rotatable sleeve surrounding said driving spindle, a housing fixed at the lower end of said sleeve and including a pair of semi-spherical members defining an internal chamber, a tool spindle extending through said housing and connected to said driving spindle for rotation in unison therewith and for longitudinal reciprocation relative thereto, a cam member pivotally mounted within the chamber of said housing and fixed against rotation with said tool spindle, rack means carried by said cam member, means extending through said housing and cooperating with said rack means for effecting the angular adjustment of said cam member, and means providing a bearing assembly rotatable with said tool spindle and cooperating with said cam member for effecting the desired longitudinal reciprocation of said tool spindle depending upon the angular adjustment of said cam member.

8. A metal working machine, comprising a rotatable driving spindle, a tool spindle connected to said driving spindle for rotation in unison therewith and for longitudinal reciprocation relative thereto, a member pivotally mounted with respect to said tool spindle and fixed against rotation therewith, means for adjusting the angular position of said member, and means rotatable with said tool spindle and cooperating with said member for effecting the desired longitudinal reciprocation of said tool spindle depending upon the angular adjustment of said member.

9. A metal working machine, comprising a rotatable driving spindle, a tool spindle connected to said driving spindle for rotation in unison therewith and for longitudinal reciprocation relative thereto, a hollow member surrounding said tool spindle and pivotally mounted with respect thereto and fixed against rotation therewith, said hollow member providing an internal camming surface, means rotatable with said tool spindle and disposed within said hollow member and cooperating with the internal cam surface for effecting the desired longitudinal reciprocation of said tool spindle, and means for adjusting the pivotal position of said hollow member whereby to adjust the reciprocating stroke of said tool spindle.

10. A metal working machine comprising a driving spindle, a housing fixed against rotation, a tool spindle extending through said housing and connected to said driving spindle for rotation in unison therewith and for longitudinal reciprocation relative thereto, cam means disposed within said housing and fixed against rotation with both said spindles, and means for effecting adjustment of said cam means whereby to adjust the reciprocating stroke of said tool spindle.

11. A metal working machine, comprising a rotatable driving spindle, a tool spindle connected to said driving spindle for rotation in unison therewith and for longitudinal reciprocation relative thereto, means providing a cam surface fixed against rotation with respect to said tool spindle for effecting longitudinal reciprocation of the tool spindle during rotation of both of said spindles, means for adjusting the position of said cam surface whereby to vary the reciprocating stroke of the tool spindle, and means for locking the cam surface in its adjusted positions.

12. A metal working machine, comprising a rotatable driving spindle, a tool spindle connected to said driving spindle for rotation in unison therewith and for longitudinal reciprocation relative thereto, a housing fixed against rotation and through which said tool spindle extends, cam means disposed within said housing for effecting longitudinal reciprocation of said tool spindle during rotation of both said spindles, means for adjusting the position of said cam means whereby to vary the reciprocating stroke of said tool spindle, said housing having a slot therethrough, and means extending through said slot and connected to said cam means and engageable with said housing for locking the said cam means in any of its adjusted positions.

13. A metal working machine, comprising a rotatable driving spindle, a tool spindle connected to said driving spindle for rotation in unison therewith and for longitudinal reciprocation relative thereto, a housing fixed against rotation and through which said tool spindle extends, cam means disposed within said housing for effecting longitudinal reciprocation of said tool spindle during rotation of both of said spindles, means for adjusting the position of said cam means whereby to vary the reciprocating stroke of said tool spindle, said housing having a slot therethrough, and means including a lubricating fitting connected to said cam means and extending through said slot and engageable with the housing for locking said cam means in any of its adjusted positions.

14. A machine for working hollow articles comprising a tool spindle centrally located with respect to the axis of the hollow article, means for driving said tool spindle, a tool carried by said spindle and offset from the axis thereof, means including a cam fixed against rotation for effecting reciprocation of said tool spindle relative to the driving means therefor during each rotation of the tool spindle, means for adjusting the angle of position of said cam relative to the axis of the tool spindle for adjusting the reciprocating stroke of the tool spindle, and means for changing the spaced relation of the hollow article and the reciprocating tool spindle for causing the tool to work the article.

15. A machine for working hollow articles comprising a driving spindle, a tool spindle connected to the driving spindle for rotation in unison therewith and for longitudinal reciprocation relative thereto, a tool carried by said tool spindle and offset from the axis of the spindle, a housing fixed against rotation through which said tool spindle extends, cam means disposed within the housing for effecting longitudinal reciprocation of the tool spindle during each rotation of said spindle, means for adjusting the position of the cam means whereby to vary the reciprocating stroke of the tool spindle, and means for moving said housing relative to the hollow article for causing the tool to engage and work the hollow article.

ALFRED O. BATES.